Dec. 2, 1969  N. D. KENNEY ET AL  3,482,033
MANUFACTURE OF HIGH VOLTAGE POLYOLEFIN
INSULATED CABLE AND ARTICLE
Filed Aug. 4, 1966
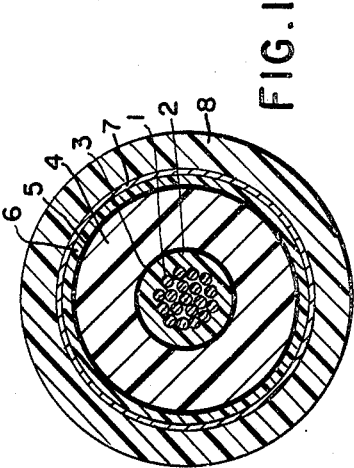
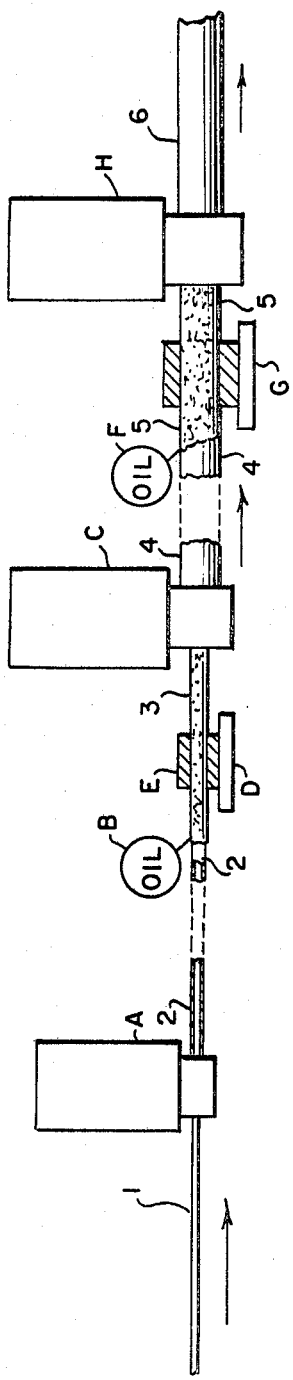
NORWOOD D. KENNEY
VICTOR S. PETTERSON
*INVENTORS*
BY
McLean, Morton and Boustead
ATTORNEYS United States Patent Office 3,482,033
Patented Dec. 2, 1969

3,482,033
MANUFACTURE OF HIGH VOLTAGE POLY-
OLEFIN INSULATED CABLE AND ARTICLE
Norwood D. Kenney, Hingham, and Victor S. Petterson,
Braintree, Mass., assignors to Simplex Wire and Cable
Company, Cambridge, Mass., a corporation of the
Commonwealth of Massachusetts
Filed Aug. 4, 1966, Ser. No. 570,322
Int. Cl. H01b 7/18; D01d 1/10; B44d 1/00
U.S. Cl. 174—102                                16 Claims

ABSTRACT OF THE DISCLOSURE

High voltage cable including a semiconducting body and a solid polyolefin insulating body in contact with the semiconducting body in which a coating is applied between the contacting surfaces of such bodies containing a major amount of aromatic hydrocarbon and a minor amount of a voltage stabilizer.

---

This invention relates to electric insulating materials of great dielectric strength for use at high voltages such as on the order of kilovolts, and more particularly to high voltage cable structures of improved voltage stability using polyolefin, e.g. polyethylene, solid dielectrics as insulation and to a method for fabricating such cables.

In the recent past, synthetic high-polymers have found increasing application as insulating materials in various electrical arts. In particular, olefin polymers, chiefly polyethylenes and polypropylene, for example, are generally suitable as insulating materials for electric cables and wires due to their good mechanical properties and workability in conjunction with excellent electrical properties. For high-voltage purposes, however, the use of such substances has been possible only within narrow limits because their theoretical electrical breakdown strength in practice is not even approached.

Careful examination of many test failures in high voltage cables has revealed that the small flaws, e.g. air spaces, dirt particles, etc. which are impossible to prevent in commercial manufacturing processes, often initiate the growth of a fault in the insulation with the actual growth of the fault, which results in failure, being due to electron avalanches derived from the current in the cable through the insulation.

In the manufacture of high voltage cables, a particular source of difficulty is the protection of the insulation surfaces. In particular, the concentration of stress in cables carrying alternating currents is greatest at the insulation surfaces adjacent a conductor, a metal sheath or the like. It is customary to protect these surfaces by the use of a semi-conducting layer, e.g., a strand shield, which can be bonded to the insulation so that air spaces in contact with the insulation are less likely to be created during manufacture or subsequent handling. One process for producing high voltage cables insulated with, for example, polyethylene and a semi-conducting strand shield, involves the tandem extrusion of strand shield and insulation over the conductor. Ideally, this produces a smooth cylindrical strand shield which adheres well to the overlying polyethylene insulation. In practice, however, there are difficulties which can result in a roughened surface of the semi-conducting layer or occasionally small areas where the bonding of the insulation to the strand shield is imperfect and voids are formed at the interface between the strand shield and overlying insulation.

Heretofore, it has been found that certain chemicals and their combinations are useful voltage stabilizing additives for polyolefins and that these additives considerably increase the slow rise breakdown voltage of the insulation when admixed with a polyolefin, e.g., polyethylene, insulation. Such additives are described in copending applications Ser. No. 372,301, field June 3, 1964 and now abandoned in the name of Laurence J. Heidt; Ser. No. 531,065, filed Mar. 2, 1966 and now Patent No. 3,350,312 in the names of Richard E. Gross and Geodge H. Hunt; and Ser. No. 544,718, filed Apr. 25, 1966 and now Patent No. 3,346,500 in the name of George H. Hunt. It is believed the additives function by absorbing energetic electrons, and thereby prevent or delay the occurrence of the electron avalanches that lead to electrical failure of polyolefin insulation. The additives after thus capturing an energetic electron slowly return to their original state by releasing the absorbed energy to the matrix as heat. These additives have been found to provide a substantial degree of protection in the insulation, but require mixing with the insulation and also still do not solve the problems resulting from the roughened surface of the semi-conducting layer discussed above.

Thus, the present invention has as an object the provision of high voltage cable having polyolefin insulation and particularly such cable having a layer of semi-conducting material in contact with a surface of the insulation in which failures caused by the presence of air spaces, voids, roughened surfaces, foreign matter, etc. at the interface between the semi-conducting layer and the insulation of the cable are minimized. Another object is the provision of high voltage cable in which the occurrence of electron avalanches through the insulation is delayed or prevented. A still further object is the improvement of the surface condition of a semi-conducting layer and the interfacial bond developed between this layer and the overlying insulation.

According to the present invention, it has been surprisingly discovered that when a combination, voltage stabilizer-oil composition of the kind described in copending application Ser. No. 367,718, filed May 15, 1964 and now abandoned, in the name of George H. Hunt, which is a blend of a major proportion of a relatively non-volatile hydrocarbon oil of high aromatic content, or a highly aromatic, low melting hydrocarbon, and a minor proportion of an active voltage stabilizing additive, such as described in the above-identified patent applications, is applied to the surface of the semi-conducting layer or the insulation, whichever is formed first, before the other is applied, e.g., by extrusion, the voltage stabilizer-oil composition not only promotes smooth passage through the extruder and good wetting at the interface, but also superior voltage stabilization of the cable is experienced, especially in the very zone where the electrical stress on the insulation is a maximum, i.e., at the interface between the insulation and the semi-conducting layer, thereby providing additional protection against electrical breakdown.

Suitable non-volatile, highly aromatic oils for use in the present invention include those oils having a total aromatic and naphthenic content of at least above 50%, preferably above 60%, and preferably the aromatic content alone is above about 40% and more particularly above 65%. Several oils suitable for use in the present invention are commercially available including Kensol P1–1, (Kendal Oil & Refining) which has a specific gravity of 1.038, an aromatic content greater than 65%, and a viscosity of 2.72 C.P. (100° C.), and a similar composition, CD–101 (Standard Oil of Ohio), which has a specific gravity of 1.035, a pour point of 20° F., viscosity SUS of 100 at 100° F. and 36 at 210° F., a refractive index of 1.601 and an analine point of less than 60° F. The aromatic content of CD–101 is thus, also greater than 65%. Other suitable oils include Sundex 85 (Sun Oil Co.) which has a viscosity in centistokes of 14.4 at 210° F. and a specific gravity of 1.017 and contains about 48% aromatics, 15% naphthenics and 37% paraffinics, and Circo Light Oil which has a viscosity in centistokes of 4.3 at 210° F. and contains about 20% aromatics, 40% naphthenics and 40% paraffinics.

Highly aromatic, low melting hydrocarbons which can be used instead of the aromatic oils include, for example O-terphenyl which has a viscosity of 40.6 at 210° F., SUS, distills in the range of 333° to 350° C., and has a melting point of 56.3° C. Mixed terphenyls are also suitable. The terphenyls can be blended with an aromatic oil to lower the melting point, preferably to below 70° C., for ease of handling. Additionally, if desired, highly aromatic hydrocarbons such as biphenyl, anthracene or phenanthrene can be blended with the aromatic oil or terphenyl to increase the aromatic content thereof.

Active voltage stabilizers which can be incorporated into the highly aromatic compounds to form the blend of the present invention include polyhalopolyphenyls, such as chlorinated biphenyls, chlorinated triphenyls and mixtures of the two, as well as brominated biphenyls, e.g., 4,4'-di-bromobiphenyl. A variety of polychlorinated polyphenyls, for example, are commercially available as mixtures including Arochlor 1260 and 1262 (Monsanto Chemical Company( which have, respectively, specific gravities of 1.538 and 1.646, refractive indices of 1.630 and 1.651 and viscosities of 44 and 103 at 210° F. (SV). Other suitable polyhalo compounds include polychlorinated and polybrominated naphthalene and anthracene and mixtures thereof.

Other effective additives include such compounds as 2,4,6-trinitrotoluene; 2-nitrodiphenylamine; 2,4-dinitrodiphenylamine; O-nitroanisole; 2,6-dinitrotoluene; 2,4-dinitrotoluene; O-nitrobiphenyl; diphenylamine; 2-nitroaniline; anthranilonitrile; 1-fluoro-2-nitrobenzene; mixtures thereof; mixtures thereof with diphenylamine; and mixtures of diphenylamine with at least one of m-dinitrobenzene, m-nitroaniline, p-nitroaniline, m-nitrotoluene, p-nitrotoluene, o-nitrochlorobenzene and p-nitrochlorobenzene. These additives have in common the following features:

(1) An electron acceptor group, especially one contain a $\pi$ bond such as $-NO_2$, $>CO$, $-CN$, phenyl and polycyclic aromatics.

(2) An electron donor group, especially one containing a transferable proton such as $-NH_2$ and $-CH_3$.

(3) Potential hydrogen bonding between the acceptor and donor groups by a transferable proton such as when the acceptor and donor groups are ortho with respect to one another, e.g., on a benzene ring.

(4) Reversibility of the proton transfer between the acceptor and donor groups, such as in the keto-enol isomerization.

(5) Structure and bonds between the acceptor and donor groups favor transfer of charge and energy such as a planar or near planar structure of a conjugated system of alternating single and double bonds.

(6) Adequate size and complexity of the conjugated system to provide for electron capture and subsequent energy dissipation without producing irreversible bond rupture.

A varity of proportions can be used in preparing the blends of the aromatic hydrocarbon oil or low melting solid with the voltage stabilizing additives. For example, as little as 5 parts, and up to 40 or 50 parts, of a stabilizing additive such as 2,4-dinitrotoluene or polyhalopolyphenyl in 100 parts of aromatic oil or orthoterphenyl can be used. 25 parts of the active stabilizing additive per 100 parts of the aromatic oil or hydrocarbon is a convenient and effective blend.

As pointed out in the aforenoted Hunt application, Ser. No. 367,718, these oil additive blends when admixed in polyolefin insulation and a semi-conducting layer provide enhanced stability of the insulation and semi-conducting layer when exposed to high voltage. The present invention is based on the surprising discovery that the same oil-additive blend when coated between the contacting surfaces of polyolefin insulation and a semi-conducting layer also enhances the voltage stability of the cable. In addition the coating of oil-additive blend also functions as an excellent, compatible lubricant for semi-conducting layers and polyolefin insulation for facilitating feeding into an extruder. Even further voltage stability is obtained when the insulation and semi-conducting layer also contain admixed oil-additive blends in accordance with application Ser. No. 367,718.

In practice, power cables in accordance with the present invention using a polyolefin insulation are formed in a conventional manner by first applying semi-conducting shielding over a stranded conductor, e.g., of copper, in order to decrease the possibility of an electrical discharge in voids between the conductor and the inner surface of the insulation with resulting deterioration of the dielectric. The shielding can be an extruded coating of a semi-conducting polyolefin material, e.g., polyethylene. The polyolefin insulating layer is then applied to the strand shield and the insulated conductor can be used as such or cabled with other insulated conductors, jacketed or otherwise finished in any desired manner. In the event a metal sheath is applied over the insulation, a second layer of semi-conducting material is applied over the insulation and then the sheath is applied.

In accordance with the present invention, a liquid oil-additive blend, as described above, is coated on the outer surface of the strand shield after application of the latter about the conductor and prior to subsequent application of overlying insulation. Similarly, if an outer semi-conducting layer is applied over the insulation, the liquid oil-additive blend is first coated on the surface of the insulation.

The semi-conducting layers can be formed using the same polyolefin material as the insulation, or any similar extrudable or otherwise readily applied polyolefin containing a conductive material, e.g., carbon black, which renders it semi-conductive. Such a semi-conducting composition can, for example, be an ethylene-acrylate copolymer containing 30 to 40 parts of carbon black per 100 parts of copolymer which gives a resistivity of about 100 ohm-cm. Generally, the semi-conducting layers can thus be almost any semi-conducting compositions conventionally employed for the purpose which are compatible with aromatic hydrocarbons.

The insulation can be any polyolefin material employed as a solid dielectric in manufacture of insulated wires and cables, such as low density polyethylene based compositions generally having a density on the order of .92 to about .95 and a melt index between 0.20 and 2.0. Specifically, such polyethylenes are those solid polymers of ethylene prepared by the "high pressure" process. Additionally, the overlying insulation can be high density (low pressure) polyethylenes and other polyolefins, e.g., polypropylene and copolymers of isobutylene and isoprene (butyl rubber), although polypropylene, because of its lack of flexibility, is not as generally useful for cable insulation. The polyoefin compositions can, if desired, contain minor amounts of the usual additives, adjuvants and fillers conventionally employed in polyethylene and similar polyolefin compositions, such as carbon black, pigments, antioxidants, heat stabilizers and ozone resistance stabilizers. Additionally, polyethylene containing rubbery polymers and copolymers of such olefins as isobutylene and isoprene and polyethylenes which have been cross-linked can be used. Polyethylenes can be cross-linked chemically using a peroxide catalyst, e.g., dicumyl peroxide, 2,5-bis(tertiary-butylperoxy)2,5-dimethylhexane, 2,5-dimethyl-2,5-di(tertiary butylperoxy)hexane-3, etc., or by irradiation of 10 to 15 megarads using, for example, cobalt-60 or a linear accelerator.

Preferably the semi-conducting layers and polyolefin insulation in accordance with the aforementioned Hunt application, Ser. No. 367,718, contain oil-additive blends for enhancing voltage stability and preferably the same blend which is admixed in the semi-conducting layers and insulation is used to coat the interfacial surfaces of insulation and semi-conducting layers in accordance with this invention.

The drawings and the examples hereinbelow serve to further illustrate the invention without limiting the same.

FIGURE 1 shows a typical cable construction; and

FIGURE 2 schematically illustrates apparatus for applying the oil composition of the present invention in block diagram.

Referring to FIGURE 2, the cable of FIGURE 1 will be described with reference to its manner of production. A conductor 1 is passed through a strand shield extruder A wherein extruded semi-conducting polyethylene strand shield 2, such as described above, is applied to the conductor 1. Following application of the strand shield 2, a voltage stabilizing additive in accordance with the present invention in liquid form as a blend of 25 parts by weight of Arochlor 1260 and 100 parts by weight of Kensol P1–1, described above, is dripped onto the surface of the semi-conducting strand shield from oil reservoir B after it exits the crosshead of the strand shield extruder A and before it enters the crosshead of the insulation extruder C. The voltage stabilizer-oil composition is applied to strand shield 2 in excess so that the surface of the semi-conducting strand shield 2 is completely wetted by the oil composition. Excess oil is wiped off by a light, wiping device D, e.g., an oil resistant wiper formed of a pair of pads E of soft polyurethane rubber. The remaining layer of oil should be too thin to drip or sag. Conductor 1 covered with semi-conducting strand shield 2 is thus uniformly wetted by a thin coating 3 of the voltage stabilizer-oil composition and thereafter enters the crosshead of the insulation extruder C. The thin oily coating 3 of stabilizer-oil composition facilitates passage through the internal tooling of the crosshead, and promotes complete wetting and adhesion to the insulation 4 applied at by extruder C.

The resultant insulated conductor exiting the crosshead of extruder C is then passed through a second oiling position in which the identical voltage stabilizer-oil mixture retained in an oil reservoir F is applied to the surface of insulation 4 in excess, completely to cover the surface. The excess oil is then wiped off by a light wiping device G similar to device D such that a thin, oily coating 5 of the stabilizer-oil mixture remains on the surface of insulation 4. The coated, insulated conductor is then passed through the crosshead of a third extruder H in which a thin semi-conducting layer 6 is applied over insulation 4. The assembly of conductor 1, strand shield 2, insulation 4 and semi-conducting layer 6 with coatings 3 and 5 at the interfaces of insulation 4 with shield 2 and layer 6, respectively, is then provided in a conventional manner with a metal sheath 7, for example, by serving with an overlapped copper tape, and with a protective jacket 8, for example, by extrusion of polyvinyl chloride loaded with carbon black.

EXAMPLE I

The table demonstrates the effectivenes of the oil-additive compositions prepared and applied as strand shield coatings in accordance with the present invention. The table compares samples of an untreated cable, of a cable in which the insulation has admixed therewith an oil-additive in accordance with Hunt application, Ser. No. 367,-718, and of a cable having the oil-additive applied to the strand shield in accordance with the present invention, as well as in the insulation.

The cable construction in each case was as follows:

Conductor: #2AWG, seven strands of .0982" copper
Strand shield: .020" wall of semi-conducting polyethylene compound
Insulation:
.220" wall of polyethylene (.92 density, .3 melt index)
N–121 is low density, high molecular weight polyethylene stabilized with .07% by weight based on the polyethylene of N,N'-diphenyl para phenylene diamine
N–171 is N–121 plus: 2% by weight, based on the polyethylene of aromatic oil (Kensol PL–1) ½% by weight, based on the polyethylene of Arochlor 1260
Outside shield:
5 mil nylon semi-conducting tape spirally applied with 17½% lap
4 mil copper tape applied with a 20% lap
Jacket: a black weather resistant PVC jacket, .080" thick The greater ability of the polyethylene insulation with oil composition applied thereon to withstand A-C voltage, as compared to the same type of polyethylene without additives and/or without the oil composition applied to the strand shield, is shown in the table.

TABLE.—RESULTS OF HIGH VOLTAGE STEP/RISE TESTS

| | Insulation Compound | | |
|---|---|---|---|
| | N–121 | N–171 | N–171 |
| | No Additives | Additive in Insulation | Additive applied on strand shield |
| | KV Test Voltage at failure or flash-over | | |
| Step period: | | | |
| 5 minutes | 76 | 109 | 152 |
| Do | | | 157 |
| Do | | | 162 |
| Do | | | 172 |
| Do | | | 189 |
| Do | | | 189 |
| Do | | | 216 |
| 45 minutes | 91 | | 182 |
| Do | 91 | | |
| Do | 109 | | |
| Do | 131 | | |
| Do | 131 | | |
| 1 hour | | | 200 |
| Do | | | 200 |
| Do | | | 200 |

EXAMPLE II

The additive of Example I when applied to the strand shield of Example I effectively protects the N–121 insulation compound against high voltage attack.

EXAMPLE III

Cables exhibiting stability to high voltages are formed substituting for the Arochlor 1260 of Example I, one of the following: 2,4,6-trinitrotoluene; 2,4-dinitrotoluene; 2,6-dinitrotoluene; 2 - nitrodiphenylamine; 2,4 - dinitrodiphenylamine; o-nitroanisole; o-nitrobiphenyl; 2-nitroanilene; anthranilonitule; 1-fluoro-2-nitrobenzene; mixture of equal parts of 2,4-dinitrotoluene and diphenylamine, and mixture of equal parts of diphenylamine and m-dinitrobenzene.

EXAMPLE IV

Cables exhibiting stability to high voltage are formed substituting for the aromatic oil of Example I, one of the following: orthoterphenyl, mixture of mixed terphenyls and biphenyl having a melting point below 70° C., and Sundex 85 (Sun Oil Co.).

EXAMPLE V

A series of five cables having identical dimensions and each including a central conductor, a strand shield and an outer polyethylene insulation were subjected to 60 cycles A.C. to determine dielectric breakdown voltage, voltage life at elevated voltages and ability to withstand load cycling at elevated temperatures. One cable was conventional and did not employ the additive and oil combination either in the insultion, strand shield or as a coating on the strand shield. In a second case, the additive and oil combination was employed only in the outer polyethylene insulation and was otherwise not used. In a third case, the additive and oil combination was employed both in the outer insulation and in the strand shield, but was not used to coat the strand shield. In the last two cases, the additive and oil combination was used in the outer insulation and not in the strand shield, but was used to coat the strand shield. In this series of cables, the additive and oil combination referred to was in each case a mixture of 100 parts by weight CD101 and 25 parts by weight Arochlor 1260. When the additive-oil combination was utilized in the polyethylene insulation, it was used in the amount of 2½ parts by weight per 100 parts by weight of polyethylene. When the additive-oil combination was utilized in the strand shield, it was utilized in a proportion of 5 parts by weight per 100 parts by weight of strand shield compound. When the additive-oil combination was applied to the surface of the strand shield, it was wiped to form a uniform thin layer which was too thin to sag or drip. The polyethylene employed was .92 density, .3 melt index containing 0.07% by weight of N,N'-diphenyl para phenylene diamine as an antioxidant.

The following table presents the results of such tests:

| Additive-oil: | | | | | |
|---|---|---|---|---|---|
| In P.E. Insulation | No | Yes | Yes | Yes | Yes |
| In Strand Shield | No | No | Yes | No | No |
| On Strand Shield | No | No | No | Yes | Yes |
| Breakdown-Volts per Mil: | | | | | |
| IPCEA Method | 340 | 500 | 720 | 820 | 900 |
| 45 Minute Step Rise | 500 | | | 750 | 830 |
| 1 Hour Step Rise | | | | 700 | 900 |
| Voltage Life, 210 Volts/Mil, Days to Failure | 91 | 134 | 29 | [1]>172 | [1]>176 |
| Load Cycle, 210 Volts/Mil, Days to Failure at— | | | | | |
| 80° C | | | | 116 | |
| 90° C | | | | | [1]>132 |

[1] Had not failed at indicated number of days.

EXAMPLES VI–XXXIII

The following table exemplifies other compositions which are utilized in accordance with this invention to coat the surface of the strand shield of a conductor as it enters the wire inlet bushing of an extruder which applies a layer of polyolefin insulation about the conductor and strand shield. The coating both increases the voltage stability of the finished insulated conductor and lubricates the strand shield surface entering the bushing.

While this invention has been described above principally in a special context, i.e., with reference to the application of coatings to strand shields over which a polyolefin insulating layer is thereafter extruded, it will be apparent from the preceding electrical test data that the invention has utility in any situation where a highly stressed semi-conducting material makes contact with polyolefin insulation in such a manner that voltage breakdown of the insulation caused by imperfections at the interface between the semi-conducting material and the insulation presents a problem.

The claims are:

1. A method for improving the voltage stability of a high voltage insulating structure including a semi-conducting body and a body of solid polyolefin insulation having a surface thereof in contact with a surface of said semi-conducting body, which method includes applying to one said surface prior to contact therewith by the other said surface, a coating of a mixture of a major amount of non-volatile aromatic hydrocarbon material and a minor amount of a voltage stabilizer for said polyolefin, said hydrocarbon material being selected from the group consisting of non-volatile hydrocarbon oils containing at least 40% aromatic hydrocarbons and not less than 50% total aromatic and naphthenic hydrocarbons and low melting, normally solid aromatic hydrocarbons, and said voltage stabilizer being selected from the group consisting of halogenated polycyclic hydrocarbons and substituted aromatic hydrocarbons having an electron donor group and an electron acceptor group potentially hydrogen bonded by a reversibly transferable proton.

2. The method of claim 1 wherein said stabilizer is a halogenated polycyclic aromatic hydrocarbon composition.

3. The method of claim 1 wherein said stabilizer is selected from the group consisting of 2,4,6-trinitrotoluene; 2,4 - dinitrotoluene; 2,6 - dinitrotoluene; 2 - nitrodiphenylamine; 2,4-dinitrodiphenylamine; o-nitroanisole; o-nitrobiphenyl; 2-nitroaniline; anthranilonitrile; 1-fluoro-2-nitrobenzene; and mixtures thereof; mixtures thereof with diphenylamine, and mixtures of diphenylamine with at least one of m-dinitrobenzene, m-nitroaniline, p-nitroaniline, m-nitrotoluene, p-nitrotolune, o-nitrochlorobenzene, and p-nitrochlorobenzene.

4. The method of claim 1 wherein said aromatic material includes orthoterphenyl.

| Ex. No. | Oil | Stabilizer | Wt. ratio of Stabilizer to Oil |
|---|---|---|---|
| VI | CD-101 | 4,4'-dibromobiphenyl | 10:100 |
| VII | o-Terphenyl | 9,10'-dibromoanthracene | 5:100 |
| VIII | Mixed terphenyls | 4-bromobiphenyl | 5:100 |
| IX | CD-101 | 4-iodobiphenyl | 20:100 |
| X | CD-101 | Diphenylamine | 40:100 |
| XI | CD-101 | 2,4,6-trinitrotoluene | 5:100 |
| XII | CD-101 | 2-nitro diphenylamine | 50:100 |
| XIII | CD-101 | o-Nitroanisole | 20:100 |
| XIV | o-Terphenyl | 2,6-dinitrotoluene | 10:100 |
| XV | CD-101+10% by weight of biphenyl | 2,4-dinitrotoluene (tech.) | 25:100 |
| XVI | CD-101+20% by wt. of anthracene | Nitrodiphenylamine | 40:100 |
| XVII | CD-101+5% by wt. of phenanthracene | 2-nitroaniline | 10:100 |
| XVIII | CD-101 | Anthranilonitrile | 25:100 |
| XIX | CD-101 | 2,6-dinitroaniline | 25:100 |
| XX | CD-101 | 1-fluoro,2-nitrobenzene | 25:100 |
| XXI | CD-101 | Equimolar mixture of diphenylamine and m-dinitrobenzene | 25:100 |
| XXII | CD-101 | Equimolar mixture of diphenylamine and m-nitrotoluene | 5:100 |
| XXIII | CD-101+5% by wt. naphthalene | Equimolar mixture of diphenylamine and p-nitrotoluene | 40:100 |
| XXIV | CD-101 | Equimolar mixture of diphenylamine and o-nitrochlorobenzene | 10:100 |
| XXV | o-Terphenyl | Equimolar mixture of diphenylamine and p-nitrochlorobenzene | 20:100 |
| XXVI | CD-101 | Phenyl alpha naphthylamine | 25:100 |
| XXVII | CD-101 | Phenyl beta | 25:100 |
| XXIX | CD-101 | Diparamethoxy diphenylamine | 25:100 |
| XXX | CD-101 | Diphenylamine | 25:100 |
| XXXI | CD-101 | 2,4-dinitrotoluene | 25:100 |
| XXXII | CD-101 | Equimolar mixture of o-nitrobiphenyl and diphenylene diamine | 25:100 |
| XXXIII | CD-101 | Equimolar mixture of 2,4-dinitrotoluene and diphenylamine | 25:100 |

5. The method of claim 1 wherein said structure is part of an electric cable including a conductor about which said semi-conducting body and dielectric body are extruded in layers and said coating is applied about the outer surface of the inner of said layers and the outer layer is thereafter extruded over said coating.

6. The method of claim 5 wherein the inner layer is a strand shield.

7. The method of claim 5 wherein said cable includes a metal sheath enclosing said layers and said semi-conducting layer is the outer of said layers.

8. The method of claim 5 wherein said stabilizer is a halogenated polycyclic aromatic hydrocarbon composition.

9. The method of claim 5 wherein said stabilizer is selected from the group consisting of 2,4,6-trinitrotoluene; 2,4-dinitrotolulene; 2,6-dinitrotoluene; 2-nitrodiphenylamine; 2,4-dinitrodiphenylamine; o-nitroanisole; o-nitrobiphenyl; 2-nitroaniline; anthranilonitrile; 1-fluoro-2-nitrobenzene; and mixtures thereof; mixtures thereof with diphenylamine, and mixtures of diphenylamine with at least one of m-dinitrobenzene, m-nitroaniline, p-nitroaniline, m-nitrotoluene, p-nitrotoluene, o-nitrochlorobenzene, and p-nitrochlorobenzene.

10. The method of claim 5 wherein said aromatic material includes orthoterphenyl.

11. In a high voltage cable including a layer of semiconducting material and a layer of polyolefin insulation, each having surfaces in contact with each other, the improvement which includes a coating between said surfaces of said layer of semi-conducting material and said layer of polyolefin insulation, said coating being of a mixture of a major amount of a non-volatile aromatic hydrocarbon material and a minor amount of a voltage stabilizer for said polyolefin, said hydrocarbon material being selected from the group consisting of non-volatile hydrocarbon oils containing at least 40% aromatic hydrocarbons and not less than 50% total aromatic and naphthenic hydrocarbons and low melting, normally solid aromatic hydrocarbons, and said voltage stabilizer being selected from the group consisting of halogenated polycyclic hydrocarbons and substituted aromatic hydrocarbons having an electron donor group and an electron acceptor group potentially hydrogen bonded by a reversibly transferably proton.

12. The improvement of claim 11 wherein said stabilizer is a halogenated polycyclic aromatic hydrocarbon composition.

13. The improvement of claim 11 wherein said stabilizer is selected from the group consisting of 2,4,6-trinitrotoluene; 2,4-dinitrotoluene; 2,6-dinitrotoluene; 2-nitrodiphenylamine; 2,4 - dinitrodiphenylamine; o-nitroanisole; o-nitrobiphenyl; 2 - nitroaniline; anthranilonitrile; 1-fluoro-2-nitrobenzene; and mixtures thereof; mixtures thereof with diphenylamine, and mixtures of diphenylamine with at least one of m-dinitrobenzene, m-nitroaniline, p - nitroaniline, m - nitrotoluene, p - nitrotoluene, o-nitrochlorobenzene, p-nitrochlorobenzene.

14. The improvement of claim 11 wherein said aromatic material includes orthoterphenyl.

15. The improvement of claim 11 wherein the semiconducting layer is a strand shield.

16. The improvement of claim 11 wherein said cable includes a metal sheath enclosing said layers and said semi-conducting layer is the outer of said layers.

References Cited
UNITED STATES PATENTS 3,218,277  11/1965  Ringwald et al. _____ 264—211 X WILLIAM L. JARVIS, Primary Examiner U.S. Cl. X.R.

117—216, 218; 264—170, 211